(12) United States Patent
Ye

(10) Patent No.: US 9,813,533 B1
(45) Date of Patent: Nov. 7, 2017

(54) ULTRA-THIN AND PORTABLE CELL PHONE HOLDER

(71) Applicant: Novel Intelligence HK Limited, Hong Kong (CN)

(72) Inventor: Qiuxia Ye, Dongguan (CN)

(73) Assignee: Novel Intelligence HK Limited, Kowloon (HK)

( * ) Notice: Subject to any disclaimer, the term of this patent is extended or adjusted under 35 U.S.C. 154(b) by 0 days.

(21) Appl. No.: 15/412,194

(22) Filed: Jan. 23, 2017

(30) Foreign Application Priority Data

Aug. 11, 2016 (CN) .................... 2016 2 0861975 U

(51) Int. Cl.
*F16M 11/00* (2006.01)
*H04M 1/11* (2006.01)
(52) U.S. Cl.
CPC .................... *H04M 1/11* (2013.01)
(58) Field of Classification Search
CPC ................ H04M 1/04; H04M 1/11
See application file for complete search history.

(56) References Cited

U.S. PATENT DOCUMENTS

| 6,499,713 | B1* | 12/2002 | Paoluccio | A47B 23/042 248/447.2 |
|---|---|---|---|---|
| 7,735,644 | B2* | 6/2010 | Sirichai | A45F 5/02 206/320 |
| 8,235,208 | B2* | 8/2012 | Sirichai | A45F 5/02 206/320 |
| 9,170,611 | B2* | 10/2015 | Gallagher | F16M 11/105 |
| 9,308,767 | B1* | 4/2016 | Waldron | B42D 15/042 |
| 9,661,906 | B2* | 5/2017 | Diebel | A45C 11/00 |
| 2009/0178938 | A1* | 7/2009 | Palmer | A45C 5/03 206/45.23 |
| 2010/0072334 | A1* | 3/2010 | Le Gette | F16M 11/041 248/176.3 |
| 2010/0090085 | A1* | 4/2010 | Corrion | A47B 23/043 248/459 |
| 2010/0294909 | A1* | 11/2010 | Hauser | B42D 9/00 248/456 |
| 2011/0290687 | A1* | 12/2011 | Han | A45C 3/02 206/320 |

(Continued)

*Primary Examiner* — Cindy Trandai
(74) *Attorney, Agent, or Firm* — Karthik Murthy; Murthy Patent Law

(57) ABSTRACT

This invention provides an ultra-thin cell phone holder comprising a stainless steel support member, a main body, a strutting piece, and an angle adjustment unit. Top of the stainless steel support member is mounted with plastic gaskets, bottom secured by an anchoring unit through locking slots. The main body includes an anchoring unit, a baffle for cradling the bottom portion of cell phone, a locking slot and a strutting piece with stainless steel strengthening piece inside. The angle adjustment unit is firmly fixed at rear face of the stainless steel support member and is configured with angle adjustment ridges for adjusting to different angles. This ultra-thin cell phone holder is an innovative design in comparison to existing cell phone holders, and is a composite design of hardware and plastics, free of supporting holes on the stainless steel support member. The design contains an angle adjustment unit having a control range of 12 levels, with a locking slot to secure moveable structures for convenient folding.

10 Claims, 5 Drawing Sheets

(56) References Cited

U.S. PATENT DOCUMENTS

| | | | | |
|---|---|---|---|---|
| 2011/0297581 A1* | 12/2011 | Angel | ............... | F16M 13/04 |
| | | | | 206/736 |
| 2012/0012483 A1* | 1/2012 | Fan | ............... | F16M 11/105 |
| | | | | 206/320 |
| 2012/0074271 A1* | 3/2012 | Goetz | ............... | F16M 13/00 |
| | | | | 248/121 |
| 2012/0176741 A1* | 7/2012 | Wu | ............... | G06F 1/1601 |
| | | | | 361/679.09 |
| 2012/0217174 A1* | 8/2012 | Ting | ............... | G06F 1/1628 |
| | | | | 206/45.2 |
| 2016/0069508 A1* | 3/2016 | Haymond | ............... | F16M 11/38 |
| | | | | 29/857 |
| 2017/0223862 A1* | 8/2017 | Justiss | ............... | H05K 7/1491 |
| | | | | 211/26.2 |

* cited by examiner

ULTRA-THIN AND PORTABLE CELL PHONE HOLDER

FIELD OF THE INVENTION

The utility model relates to technology of construction of cell phone holding device, more specifically an ultra-thin cell phone holder.

BACKGROUND OF THE INVENTION

The support member and strutting piece of existing similar products are generally made of plastics with unsatisfactory supporting strength. In these similar products, there is a lack of stability even if a substance stronger than plastic is utilized, because of the easy separation between hardware and plastics.

Some designs related to the position for holding cell phone are deficient because users have to use both hands to set up the cell phone holder, which is inconvenient. While some use a metal piece to hold a cell phone, this causes problems such as cell phone scratches. Other products have too many holes on the support surface, which damage the overall appearance and surface integrity of the cell phone.

SUMMARY OF THE INVENTION

This utility model provides the invention of an ultra-thin cell phone holder that does not require the user to use both hands to set up the cell phone holder, and does not have many holes on the support surface.

For the above mentioned purpose, the utility model presents a technical proposal wherein an ultra-thin cell phone holder comprises a stainless steel support member, a main body, a strutting piece and an angle adjustment unit. The top of the stainless steel support member is mounted with plastic gaskets, bottom secured by an anchoring unit. The main body includes an anchoring unit, a baffle for cradling the bottom portion of cell phone, a locking slot and a strutting piece with stainless steel strengthening piece inside. The angle adjustment unit is firmly fixed at rear face of the stainless steel support member and is configured with angle adjustment ridges.

In one embodiment, the plastic gaskets are two U-shaped connection pieces that slide in and attach onto the support member.

In another embodiment, the anchoring unit is a fixing device whose connector is the same thickness as the stainless steel support member.

In another embodiment, the baffle for cradling the bottom portion of cell phone is a rotatable piece with an adjustable angle of 0-90°

In another embodiment, the stainless steel strengthening piece is Y-shaped.

In another embodiment, the angle adjustment ridges are configured with step ridge positioners.

In another embodiment, the angle of the strutting piece is adjustable between 0-90°.

In another embodiment, the plastic gaskets are two U-shaped connection pieces that slide in and attach onto the support member; the anchoring unit is a fixing device whose connector is the same thickness as the stainless steel support member; the baffle for cradling the bottom portion of cell phone is a rotatable piece with an adjustable angle of 0-90°; the stainless steel strengthening piece is Y-shaped; the angle adjustment ridges are configured with step ridge positioners; and the angle of the strutting piece is adjustable between 0-90°.

Compared with existing technology, the benefit of the utility model is that the ultra-thin cell phone holder is an innovative design in comparison to current cell phone holders on the market, achieving an overall integrated design between hardware structure and plastic structure for the entirety of cell phone holder, and adopting a design free of supporting holes on the stainless steel support member in consideration of the overall appearance, and configured with an angle adjustment unit having a control range of 12 levels, with a locking slot to secure moveable structures for convenient folding. An appropriate angle is preset, taking advantage of the memory characteristics of plastic, which would release voluntarily after being pulled out when in use, which greatly enhances convenience in use.

BRIEF DESCRIPTION OF THE FIGURES

As shown in FIGS. 1 to 5: 1 stainless steel support member, 2 plastic gaskets, 3 anchoring unit, 4 baffle for cradling the bottom portion of cell phone, 5 main body, 6 locking slot, 7 strutting piece, 8 stainless steel strengthening piece, 9 angle adjustment unit, 10 angle adjustment ridges.

DETAILED DESCRIPTION OF THE INVENTION

A more complete and explicit description of the technical proposal related to this utility model may be acquired by referring to the following description in cooperation with the accompanying drawings. The illustrated embodiments are merely a portion of but not all embodiments related to the utility model. Any other embodiment related to this utility model acquired by those skilled in this art without making any creative labor is within the scope of the claim.

Figure 1:
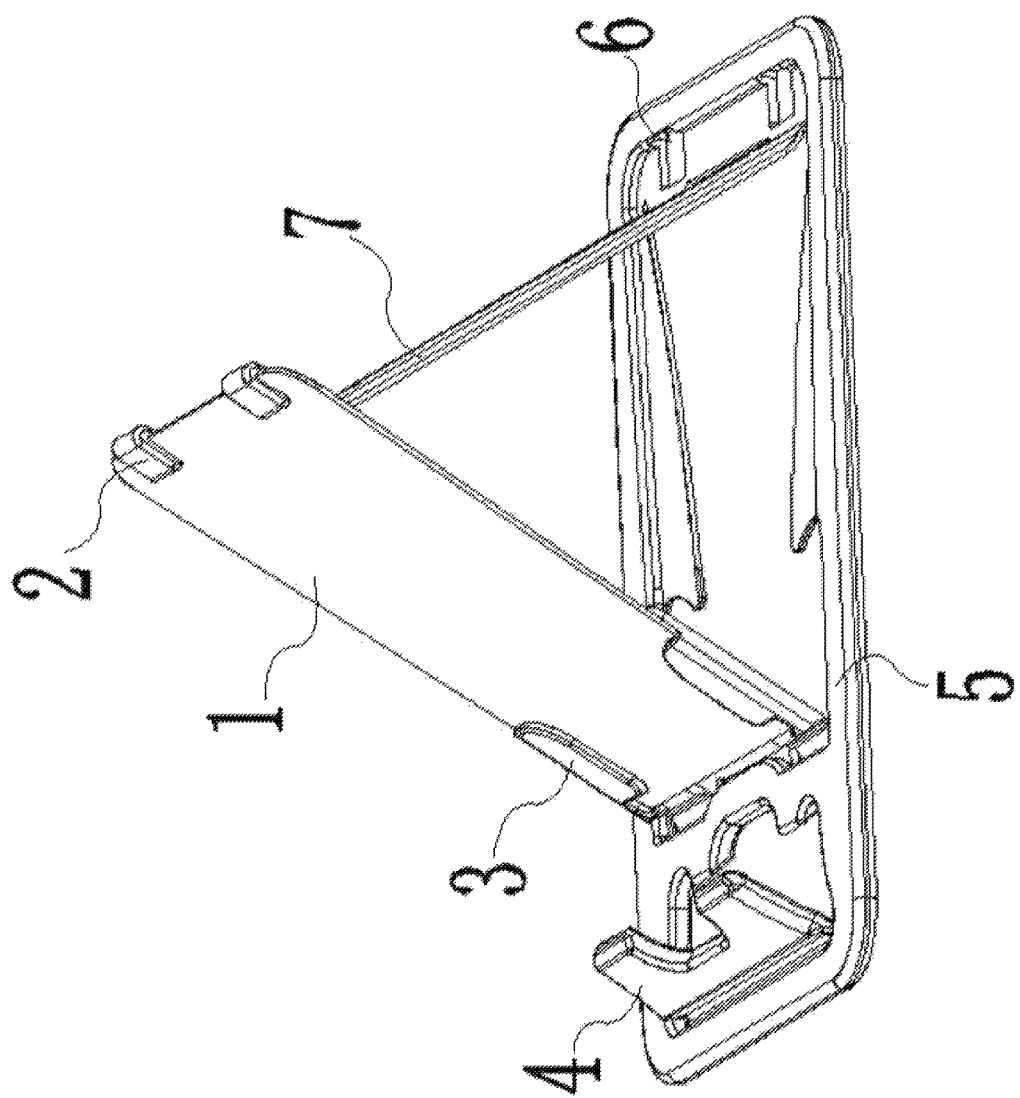
FIG. 1 shows the construction of the utility model.
Figure 2:
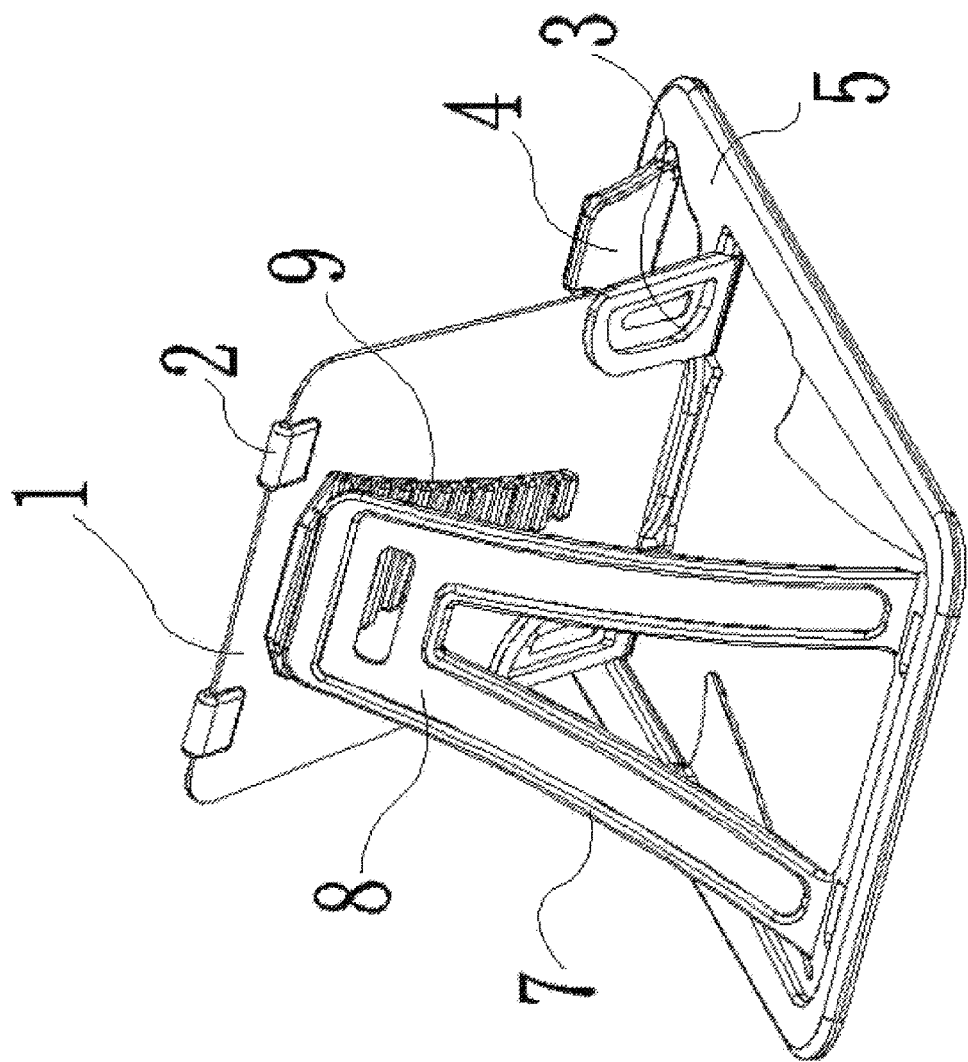
FIG. 2 shows the rear part of the utility model.
Figure 3:
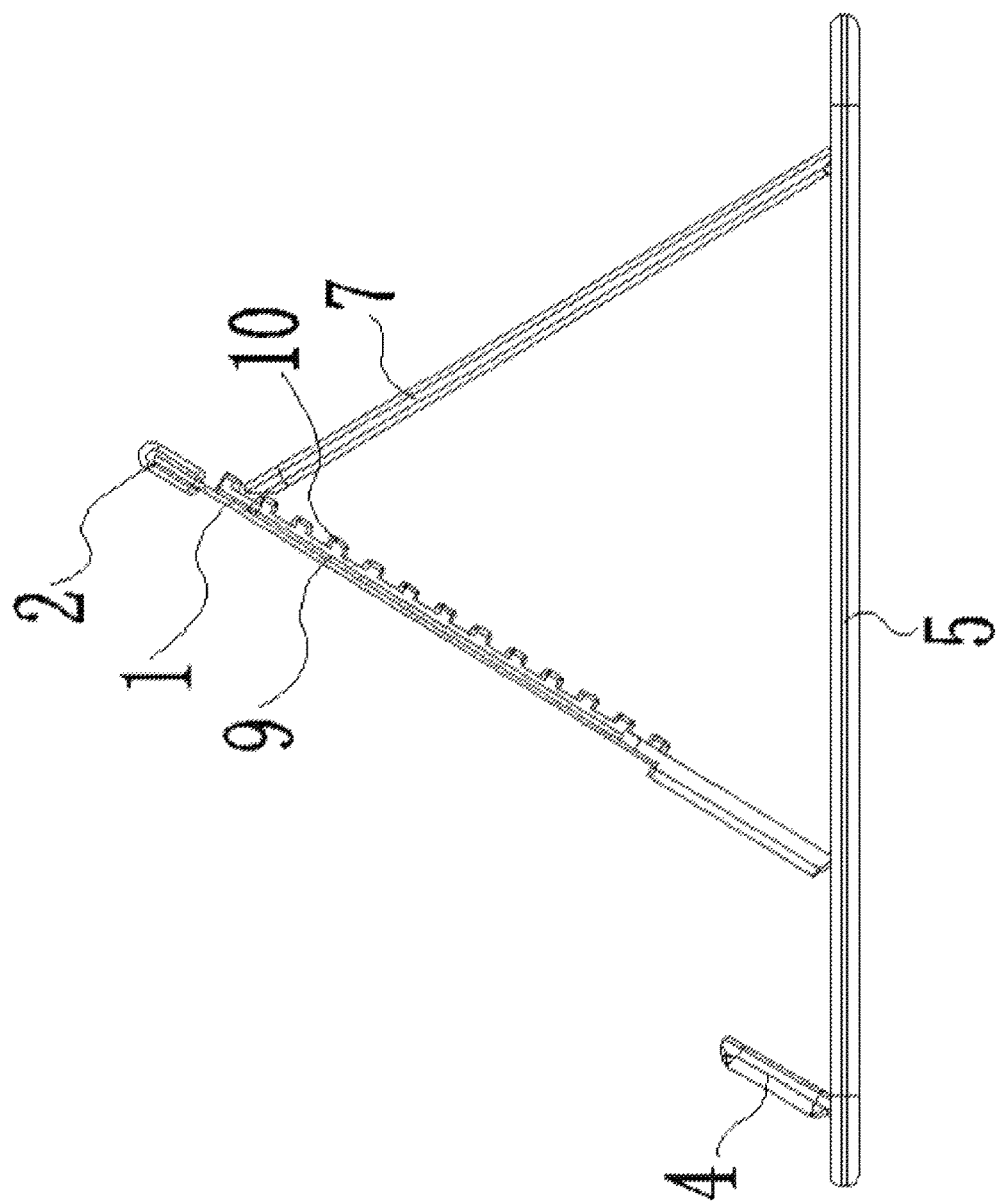
FIG. 3 shows the side part of the utility model.
Figure 4:
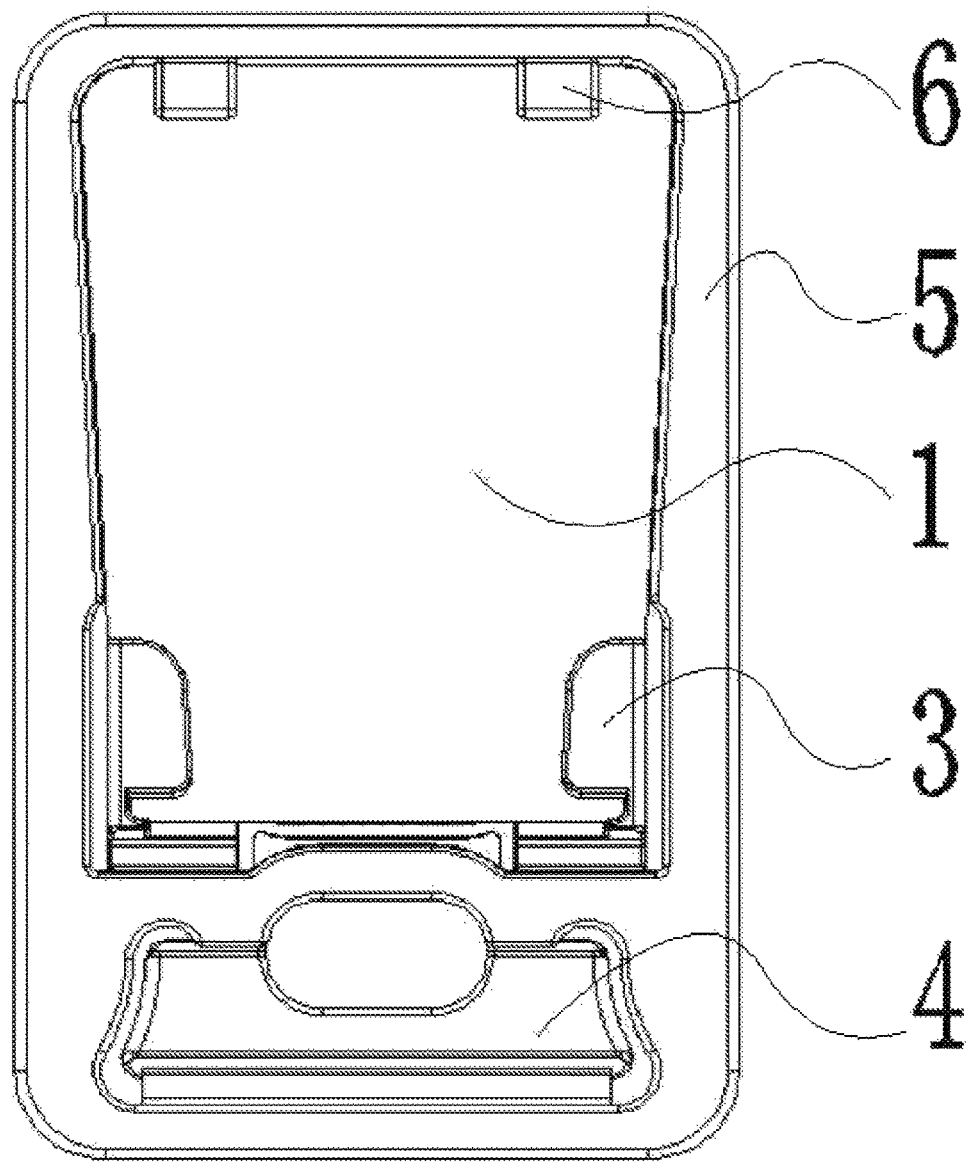
FIG. 4 shows the folded front part of the utility model.
Figure 5:
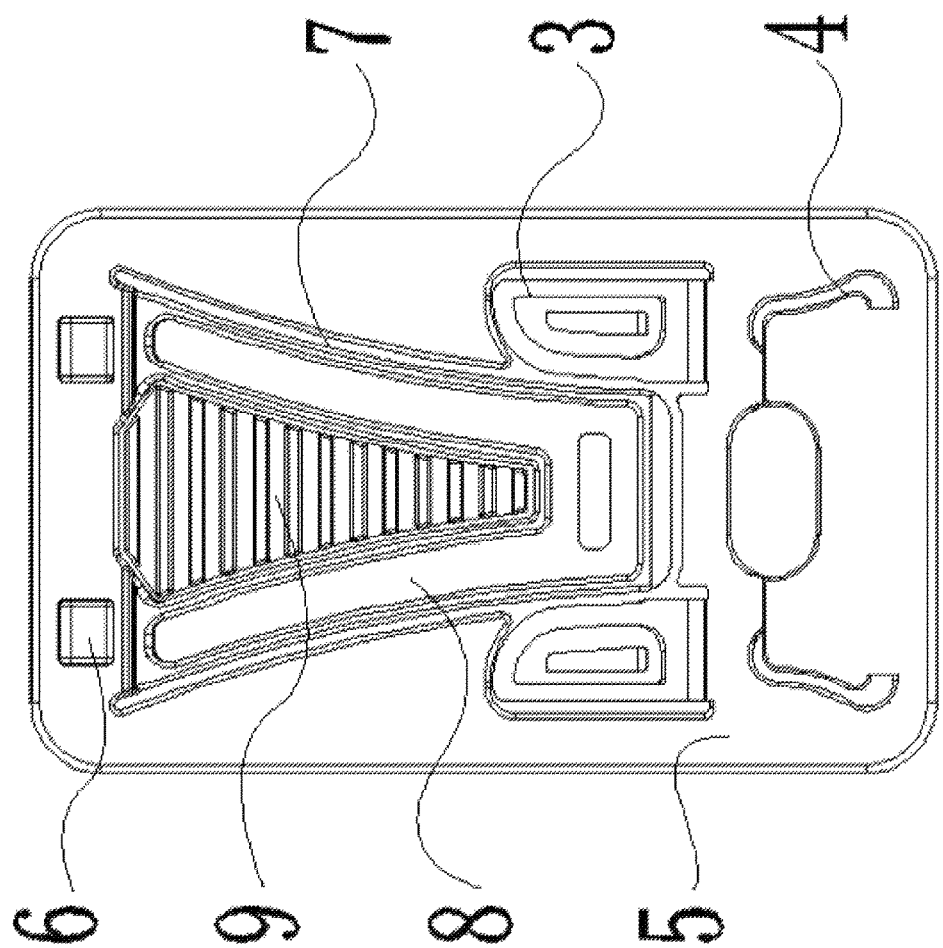
FIG. 5 shows the folded reverse part of the utility model.

Referring to FIGS. 1 to 5, the utility model provides a technical proposal wherein an ultra-thin cell phone holder comprising a stainless steel support member 1, plastic gaskets 2, an anchoring unit 3, a baffle for cradling the bottom portion of cell phone 4, a main body 5, a locking slot 6, a strutting piece 7, a stainless steel strengthening piece 8, an angle adjustment unit 9, and angle adjustment ridges 10. Top of the stainless steel support member 1 is mounted with the plastic gaskets 2 that are two U-shaped connection pieces that slide in and attach onto the support member, and bottom secured by the anchoring unit 3. The main body 5 includes the anchoring unit 3, the baffle for cradling the bottom portion of cell phone 4, the locking slot 6 and the strutting piece 7. The anchoring unit 3 is a fixing device whose connector is the same thickness as the stainless steel support member 1. The baffle for cradling the bottom portion of cell phone 4 is a rotatable piece with an adjustable angle of 0-90°. The strutting piece 7 is configured with the stainless steel strengthening piece 8 inside, and has an adjustable angle of 0-90°. The stainless steel strengthening piece 8 is a Y-shape. The angle adjustment unit 9 is firmly fixed at rear face of the stainless steel support member 1 and configured with angle adjustment ridges 10 having a control range of 12 levels.

Operating principle: a quick understanding of the structure is necessary before using this utility model ultra-thin cell phone holder. First get a suitable angle of the cell phone holder via the angle adjustment unit 9 and angle adjustment ridges 10, which is facilitated by support of the strutting piece 7 and the stainless steel strengthening piece 8. Then place the cell phone on the stainless steel support member 1 and the plastic gaskets 2 would protect the phone from scratching. The baffle for cradling the bottom portion of cell phone 4 would secure the cell phone at the same time. The cell phone holder is made good use as described above.

While embodiment of the utility model has been shown and described, it is understood that those skilled in the art could make various changes, substitutes and modifications without departing from the spirit and scope of the claims. The scope of the present invention should be limited only by the appended claims and equivalent.

The invention claimed is:

1. An ultra-thin cell phone holder comprising of a stainless steel support member, a main body, a strutting piece, and an angle adjustment unit, characterized by: a steel support member that is mounted with plastic gaskets, and its bottom secured by an anchoring unit; the main body includes an anchoring unit, a baffle for cradling the bottom portion of cell phone, a locking slot, and a strutting piece with stainless steel strengthening piece inside; the angle adjustment unit is firmly fixed at rear face of the stainless steel support member and is configured with angle adjustment ridges for adjusting to different angles.

2. The ultra-thin cell phone holder according to claim 1 wherein the plastic gaskets are two U-shaped connection pieces that slide in and attach onto support member.

3. The ultra-thin cell phone holder according to claim 1 wherein the anchoring unit is a fixing device whose connector is the same thickness as the stainless steel support member.

4. The ultra-thin cell phone holder according to claim 1 wherein the baffle for cradling the bottom portion of cell phone is a rotatable piece with an adjustable angle of 0-90°.

5. The ultra-thin cell phone holder according to claim 1 wherein the stainless steel strengthening piece is a Y-shape.

6. The ultra-thin cell phone holder according to claim 1 wherein the angle adjustment ridges has a control range of levels.

7. The ultra-thin cell phone holder according to claim 1 wherein the strutting piece has an adjustable angle of 0-90°.

8. The ultra-thin cell phone holder according to claim 1
   wherein the plastic gaskets are two U-shaped connection pieces that slide in and attach onto support member;
   wherein the anchoring unit is a fixing device whose connector is the same thickness as the stainless steel support member;
   wherein the baffle for cradling the bottom portion of cell phone is a rotatable piece with an adjustable angle of 0-90°;
   wherein the stainless steel strengthening piece is a Y-shape;
   wherein the angle adjustment ridges has a control range of levels;
   and wherein the strutting piece has an adjustable angle of 0-90°.

9. A cell phone holder comprising of a stainless steel support member, a main body, a strutting piece, and an angle adjustment unit, characterized by: a steel support member that is mounted with plastic gaskets, and its bottom secured by an anchoring unit; the main body includes an anchoring unit, a baffle for cradling the bottom portion of cell phone, a locking slot, and a strutting piece with stainless steel strengthening piece inside; the angle adjustment unit is firmly fixed at rear face of the stainless steel support member and is configured with angle adjustment ridges for adjusting to different angles,
   wherein the plastic gaskets are two U-shaped connection pieces that slide in and attach onto support member;
   wherein the anchoring unit is a fixing device whose connector is the same thickness as the stainless steel support member;
   wherein the baffle for cradling the bottom portion of cell phone is a rotatable piece with an adjustable angle of 0-90°;
   wherein the stainless steel strengthening piece is a Y-shape;
   wherein the angle adjustment ridges has a control range of levels; and wherein the strutting piece has an adjustable angle of 0-90°.

10. A method of setting up a cell phone holder using one hand,
    wherein the cell phone holder comprises a stainless steel support member, a main body, a strutting piece, and an angle adjustment unit, characterized by: a steel support member that is mounted with plastic gaskets, and its bottom secured by an anchoring unit; the main body includes an anchoring unit, a baffle for cradling the bottom portion of cell phone, a locking slot, and a strutting piece with stainless steel strengthening piece inside; the angle adjustment unit is firmly fixed at rear face of the stainless steel support member and is configured with angle adjustment ridges for adjusting to different angles, wherein the plastic gaskets are two U-shaped connection pieces that slide in and attach onto support member;
    wherein the anchoring unit is a fixing device whose connector is the same thickness as the stainless steel support member;
    wherein the baffle for cradling the bottom portion of cell phone is a rotatable piece with an adjustable angle of 0-90°;
    wherein the stainless steel strengthening piece is a Y-shape;
    wherein the angle adjustment ridges has a control range of levels;
    and wherein the strutting piece has an adjustable angle of 0-90°,
    wherein the user gets a suitable angle of the cell phone holder via the angle adjustment unit and angle adjustment ridges, which is facilitated by support of the strutting piece and the stainless steel strengthening piece, then the user places the cell phone on the stainless steel support member and the plastic gaskets would protect the phone from scratching, and the baffle for cradling the bottom portion of cell phone would secure the cell phone at the same time.

* * * * *